United States Patent
Pyla et al.

(10) Patent No.: US 11,507,394 B1
(45) Date of Patent: Nov. 22, 2022

(54) CHANGING ACCELERATOR CARD IMAGES WITHOUT HOST SYSTEM REBOOT

(71) Applicant: Xilinx, Inc., San Jose, CA (US)

(72) Inventors: Siva Santosh Kumar Pyla, Hyderabad (IN); Ravinder Sharma, Hyderabad (IN); Gokul Kavungal Nechikott, Thrissur (IN); Saifuddin Kaijar, Hyderabad (IN); Brian S. Martin, Longmont, CO (US); Suraj Patel, Hyderabad (IN); Rishabh Gupta, San Jose, CA (US); Ch Vamshi Krishna, Hyderabad (IN); Kaustuv Manji, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/408,152

(22) Filed: Aug. 20, 2021

(51) Int. Cl.
*G06F 9/445* (2018.01)
*G06F 9/4401* (2018.01)
*G06F 13/42* (2006.01)

(52) U.S. Cl.
CPC ........ *G06F 9/44505* (2013.01); *G06F 9/4401* (2013.01); *G06F 9/44521* (2013.01); *G06F 13/4221* (2013.01); *G06F 2213/0026* (2013.01)

(58) Field of Classification Search
CPC .............. G06F 9/44505; G06F 9/4401; G06F 9/44521; G06F 13/4221; G06F 2213/0026
See application file for complete search history.

(56) References Cited

U.S. PATENT DOCUMENTS

| | | | |
|---|---|---|---|
| 8,166,431 B1 | 4/2012 | McAndrew | |
| 9,323,876 B1 | 4/2016 | Lysaght et al. | |
| 9,864,828 B1 * | 1/2018 | Puthana | G06F 30/331 |
| 10,031,760 B1 | 7/2018 | Santan et al. | |
| 10,817,353 B1 * | 10/2020 | Kain | G06F 9/545 |
| 11,055,106 B1 | 7/2021 | Cochell et al. | |
| 2007/0094486 A1 * | 4/2007 | Moore | G06F 9/4401 713/1 |

OTHER PUBLICATIONS

Xilinx, SmartSSD Computational Storage Drive Installation and User Guide, UG1382 (v1.2) Jun. 17, 2021, 66 pages.
Xilinx Answer 46888, Virtex-5 Endpoint Block Plus for PCI Express—Debugging and Packet Analysis Guide with Downstream Port Model and PIO Example Design, 61 pages , Mar. 20, 2012.

* cited by examiner

*Primary Examiner* — Glenn A. Auve
(74) *Attorney, Agent, or Firm* — Kevin T. Cuenot

(57) ABSTRACT

Changing accelerator card images without rebooting a host system includes receiving, within an integrated circuit (IC) of an accelerator card, an address of a platform image stored in a non-volatile memory of the accelerator card. The address is received over a communication link between the host system and the accelerator card while the communication link is connected. Changing accelerator card images includes detecting, within a register of the IC, that a warm boot enable flag is set and that the communication link with the host system is disconnected. In response to detecting that the warm boot enable flag is set and that the communication link is disconnected, loading of the platform image from the address of the non-volatile memory into the integrated circuit is initiated.

20 Claims, 7 Drawing Sheets

CHANGING ACCELERATOR CARD IMAGES WITHOUT HOST SYSTEM REBOOT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to accelerator cards used with a host system and, more particularly, to changing the image of an accelerator card without rebooting the host system.

BACKGROUND

A data processing system, e.g., a computer, may include or be connected to any of a variety of different peripheral devices that are designed to expand the functionality of the data processing system. In some cases, these peripheral devices are implemented as a "card" that can be inserted into an available bus slot of the data processing system. For example, a variety of cards are available that may be inserted into an unoccupied PCIe slot of a data processing system. In other cases, the peripheral device is implemented in a housing or chassis that is physically separate from the data processing system. The peripheral device may be communicatively linked to the data processing system through another type of connection.

These different types of peripheral devices are often referred to as "expansion cards." One type of expansion card, known as an "accelerator card," may be used with a data processing system to accelerate the performance of a given workload. An application executed by the processor of the data processing system may offload a workload to the accelerator card. The accelerator card may perform the workload more efficiently, faster, and/or using less power, than were the processor of the data processing system to perform the workload. The accelerator card makes any results from performing the workload available to the host system.

SUMMARY

In one or more example implementations, a method includes receiving, within an integrated circuit (IC) of an accelerator card, an address of a platform image stored in a non-volatile memory of the accelerator card. The address is received over a communication link between a host system and the accelerator card while the communication link is connected. The platform image specifies, at least in part, platform circuitry for implementation in the IC. The method includes detecting, within a register of the IC, that a warm boot enable flag is set and that the communication link with the host system is disconnected. The method also includes, in response to detecting that the warm boot enable flag is set and that the communication link is disconnected, initiating loading of the platform image from the address of the non-volatile memory into the IC.

In one or more example implementations, a system includes an accelerator card having a non-volatile memory and an IC. The IC includes a communication interface configured to communicate over a communication link, a warm boot controller coupled to the communication interface, an internal configuration access port coupled to the warm boot controller, and a memory controller coupled to the internal configuration access port. The memory controller is configured to communicate with the non-volatile memory. The warm boot controller is configured to instruct the internal configuration access port to load a platform image from the non-volatile memory into the IC via the memory controller in response to determining that a warm boot enable flag is set and the communication link is disconnected.

In another aspect, the system includes a host system coupled to the IC via the communication link. The host system is configured to set the warm boot enable flag in the IC and, in response to setting the warm boot enable flag, disconnect the communication link.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to accelerator cards used with a host system and, more particularly, to changing the firmware of an accelerator card without rebooting the host system. An accelerator card requires that firmware be loaded therein to operate. Newer versions of the firmware for the accelerator card are developed over time that fix bugs, improve operational efficiency, or implement different functionality. The accelerator card undergoes a procedure for transitioning from the current or existing firmware to the new firmware. Traditionally, this procedure has required a reboot of the host system. That is, to update the firmware of an accelerator card of a host system, the host system was required to be power cycled (turned off and turned back on).

Power cycling a host system is often undesirable and can be costly in terms of lost computing time. During the time the host system is rebooted, the host system is inoperable (e.g., unable to perform computing operations). System uptime requirements for computing environments implemented in data centers for commercial and/or personal use may be violated by continued reboots a host system. Further, the host system may include a plurality of different expansion cards where only one or a subset of the total number of expansion cards of the host system require firmware updates. In such cases, rebooting the host system to update the firmware of one or even a subset of the expansion cards of the host system brings all of the expansion cards of the host system down. That is, all of the expansion cards of the host system are incapable of performing computing operations during the time period that the host system is rebooted.

In accordance with the inventive arrangements described within this disclosure, firmware of one or more selected accelerator cards may be updated without having to reboot the host system. The host system, including other expansion cards of the host system not undergoing firmware updates, may remain operational while the firmware of the one or more selected accelerator cards are updated. This allows the host system and other expansion cards of the host system to continue operating and performing workloads while the one or more selected accelerator cards are updated.

Figure 1:
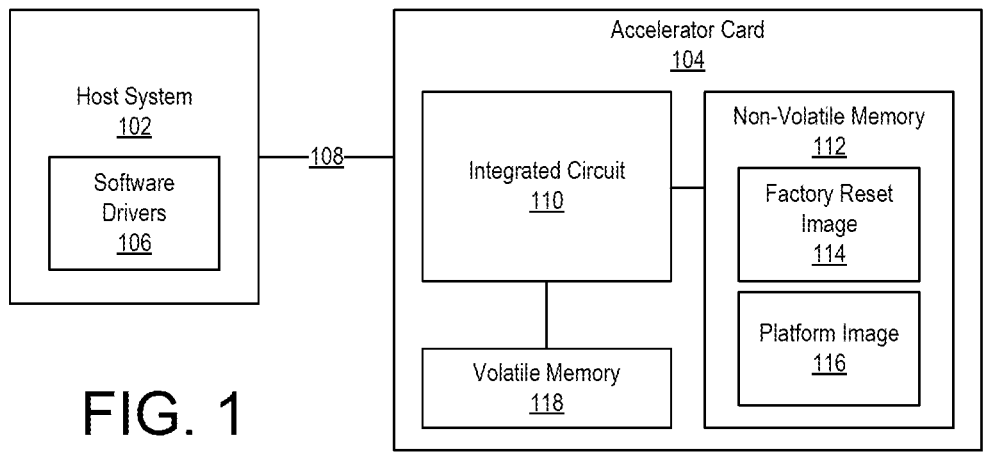
FIG. 1 illustrates an example computing environment including a host system and an accelerator card.

FIG. 1 illustrates an example computing environment including a host system 102 and an accelerator card 104. Host system 102 is implemented as a data processing system. Host system 102 further includes one or more software drivers 106 that, when executed by a processor of host system 102, facilitate communication between host system 102 and accelerator card 104 via communication link 108. Communication link 108 may be implemented over a particular communication channel. In one aspect, communication link 108 may be a communication session established over the communication channel. In an example implementation, the communication channel is a communication bus such as, for example, a Peripheral Component Interconnect Express (PCIe) bus.

Accelerator card 104 may be implemented as a circuit board that may be communicatively linked to host system 102. Accelerator card 104 may, for example, be inserted into an available bus slot (e.g., of a PCIe bus) of host system 102 or connected to the bus via another mechanism (e.g., another port or expansion chassis). In the example, accelerator card 104 includes an integrated circuit (IC) 110 coupled to a non-volatile memory 112 and a volatile memory 118. Non-volatile memory 112 may be implemented as a flash memory and is capable of storing firmware for IC 110. Volatile memory 118 may be implemented as a random-access memory (RAM). Non-volatile memory 112 and volatile memory 118 are illustrated as being external to IC 110 and may be considered local to IC 110.

IC 110 may be implemented as any of a variety of different ICs that may require the loading of firmware to operate. In one aspect, IC 110 may be implemented as a programmable IC. Examples of a programmable IC include, but are not limited to, a Field Programmable Gate Array (FPGA), a System-on-Chip (SoC), an IC that includes at least some programmable circuitry, and/or an Adaptive Compute Acceleration Platform (ACAP). Programmable circuitry may include programmable logic. As an illustrative and non-limiting example, an SoC and/or an ACAP type of IC may include one or more different subsystems therein. Examples of subsystems of IC 110 include, but are not limited to, programmable logic, a processor system having one or more processors and/or cores, a data processing engine array, a network-on-chip (NoC), or any combination of one or more of the example subsystems listed.

Non-volatile memory 112 is capable of storing firmware as one or more image files. As pictured, non-volatile memory 112 is capable of storing a factory reset image 114 and a platform image 116. Factory reset image 114 is a known good, or gold standard, image file that, when loaded into IC 110, places IC 110 and accelerator card 104 in a known good operating state that allows IC 110 to be recovered and/or reset. In one example, factory reset image 114 is capable of implementing a circuit architecture in IC 110 that is capable of communicating with host system 102, responding to instructions from host system 102, storing new platform images in non-volatile memory 112 from time-to-time or as instructed by host system 102, and loading a selected platform image.

Platform image 116 is an example of firmware for IC 110. As defined within this disclosure, the term "firmware" means data that, when loaded into an IC, implements a circuit architecture in the IC referred to as "platform circuitry." The platform circuitry is circuitry that is capable of communicating with a host system, with a non-volatile memory, and with user circuitry. As an example, firmware, when loaded into IC 110, implements the platform circuitry using programmable logic, by configuring hardwired circuit blocks, and/or by programming processors of the IC, whether such processors are implemented as hardwired processors or implemented in programmable logic. It should be appreciated that platform circuitry may also provide user circuitry with connectivity to volatile memory 118 of accelerator card 104 and/or access to other resources of IC 110.

As noted, the platform circuitry is capable of communicating with user circuitry. In some cases, the firmware specifies both the platform circuitry and the user circuitry as part of the same image file. In other cases, the firmware specifies only the platform circuitry while user circuitry may be specified by one or more other image files (e.g., separate from the firmware).

In the example of FIG. 1, to update IC 110 to different (e.g., new and/or updated) firmware and, as such, different platform circuitry, the new firmware is loaded into IC 110 from non-volatile memory 112. For example, to update firmware of IC 110 and the platform circuitry contained therein, a different platform image is stored in non-volatile memory 112 and then loaded into IC 110 from non-volatile memory 112.

Figure 2:
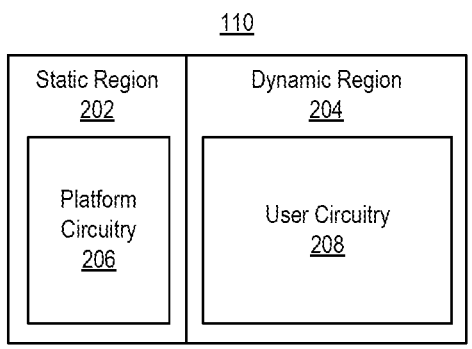
FIG. 2 illustrates an example of firmware specified by a platform image in which dynamic function exchange is used.
Figure 3:
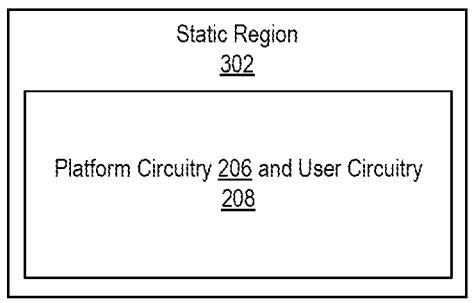
FIG. 3 illustrates another example of firmware specified by a platform image where dynamic function exchange is not used.

FIGS. 2 and 3 illustrate different example implementations of firmware for IC 110. FIG. 2 illustrates an example of firmware specified by platform image 116 in which dynamic function exchange, also known as "dynamic partial reconfiguration," is used. In the example of FIG. 2, platform image 116 specifies platform circuitry 206, which is implemented within static region 202 of IC 110. Static region 202 includes programmable circuitry and/or one or more hardwired circuit blocks in which one or more or all of the components of platform circuitry 206 may be implemented. Static region 202 further provides connectivity to user circuitry 208 implemented in dynamic region 204.

Dynamic region 204 refers to the portion of IC 110 that is not used by static region 202 and that may be used to implement a user application depicted as "user circuitry" 208. Using the implementation of FIG. 2, platform circuitry 206 is capable of continuing to operate uninterrupted while different user circuitry capable of performing different functions than user circuitry 208 may be implemented in dynamic region 204 over time. In the example of FIG. 2, platform circuitry 206 and user circuitry 208, though communicatively linked within IC 110, may be considered separate circuit designs that are distinct as implemented in IC 110.

For example, a first image, e.g., platform image 116 may be loaded into IC 110 from non-volatile memory 112 to implement platform circuitry 206 therein. Subsequently, a second image file may be loaded into IC 110 that specifies user circuitry 208. Subsequently, a third image file may later be loaded into IC 110 that specifies different user circuitry to be implemented in dynamic region 204. Unlike platform image 116, the second and third image files may be provided to IC 110 directly from host system 102 (e.g., without first writing the image file(s) to non-volatile memory 112). In this manner, dynamic region 204 is reconfigured to implement the different user circuitry over time while platform circuitry 206 continues to operate uninterrupted. As such, IC 110 is, for example, capable of maintaining communication link 108 with host system 102. Further, in the example of FIG. 2, different user circuitry may be implemented in dynamic region 204 without requiring reboot of host system 102.

In a conventional system with an accelerator card and a configuration as illustrated in FIG. 2, if the platform circuitry is to be updated, a reboot of the host system is necessary. The new platform image is first stored in the non-volatile memory. A reboot of the host system causes the IC to load the new platform image from the non-volatile memory therein during the reboot of the host system.

FIG. 3 illustrates another example of firmware specified by platform image 116. In the example of FIG. 3, dynamic function exchange is not used. In the example of FIG. 3, platform image 116 specifies both platform circuitry 206 and user circuitry 208. In the example of FIG. 3, both platform circuitry 206 and user circuitry 208 are implemented within static region 202 of IC 110. IC 110 does not include a dynamic region. Platform circuitry 206 and user circuitry 208 are comingled and implemented as a single circuit design by a single image file.

In the example of FIG. 3, because both platform circuitry 206 and user circuitry 208 are implemented by loading a single image file, e.g., platform image 116, changing user circuitry in IC 110 requires loading a different platform image. This process also will reimplement platform circuitry 206 in IC 110 or implement different platform circuitry in IC 110, thereby disrupting operation of the platform circuitry. That is, implementing new and/or different user circuitry within IC 110 in the example of FIG. 3 removes the existing platform circuitry and implements/reimplements platform circuitry. As such, IC 110 is unable to maintain communication link 108 with host system 102 during an update of either platform circuitry 206 or user circuitry 208. Further, in the example of FIG. 3, the platform image is loaded from non-volatile memory 112.

In a conventional system with an accelerator card and a configuration as illustrated in FIG. 3, if either the platform circuitry or the user circuitry is to be updated, a reboot of the host system is necessary. The new platform image is first stored in the non-volatile memory. A reboot of the host system causes the IC to load the new platform image from the non-volatile memory therein during the reboot of the host system.

Figure 4:
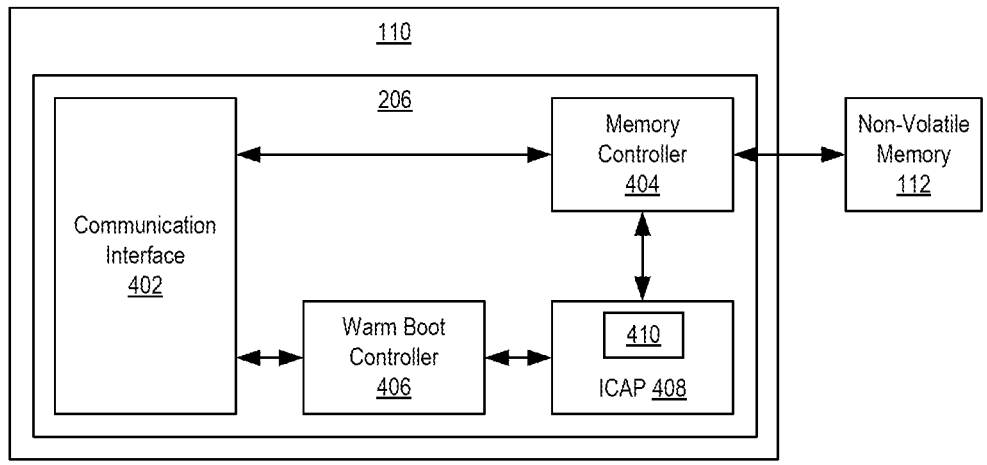
FIG. 4 illustrates an example implementation of platform circuitry for an IC.

FIG. 4 illustrates an example implementation of platform circuitry 206 for IC 110. As noted, platform circuitry 206 may be specified by platform image 116. In the example, platform circuitry 206 includes a communication interface 402, a memory controller 404, a Warm Boot Controller (WBC) 406, and an Internal Configuration Access Port (ICAP) 408. Communication interface 402 is coupled to memory controller 404 and to WBC 406. WBC 406 is coupled to ICAP 408. ICAP 408 is coupled to memory controller 404.

Communication interface 402 is configured to communicate over communication link 108. Communication interface 402 may be implemented as an endpoint for a communication bus. For example, communication interface 402 may be implemented as a PCIe endpoint. Communication interface 402 may be implemented as a hardwired circuit or implemented using programmable logic. Memory controller 404 is capable of communicating with non-volatile memory 112 to perform read and write operations. For example, memory controller 404 may be implemented as a flash memory controller. Memory controller 404 is capable of responding to commands received from communication interface 402 and/or ICAP 408 and translate those commands into instructions that are understandable by non-volatile memory 112. Memory controller 404 may be implemented as a hardwired circuit or implemented using programmable logic.

WBC 406 is capable of performing various operations supporting warm boot functionality described herein. In other words, WBC 406 is capable of performing operations that allow the firmware of IC 110 to be updated without rebooting host system 102. In the example of FIG. 4, WBC 406 is capable of controlling operation of ICAP 408. In general, WBC 406 is capable of instructing ICAP 408 to load a platform image from non-volatile memory 112 into IC 110 via memory controller 404 in response to determining that a warm boot enable flag is set and communication link 108 is disconnected.

For example, WBC 406 is capable of configuring a "warm boot start address register" 410 that may be included in IC 110. In another aspect, warm boot start address register 410 may be external to ICAP 408 so long as the register is accessible by ICAP 408. WBC 406 further is capable of issuing command(s) to ICAP 408 instructing ICAP 408 to load an image file located at the address specified by the warm boot start address register 410. In one aspect, WBC 406 may be implemented as a hardwired circuit. In another aspect, WBC 406 may be implemented in programmable logic. In either case, being included in platform circuitry 206, WBC 406 may be incorporated into, or used by, user circuitry.

ICAP 408 is a circuit that is capable of reading and writing registers, e.g., configuration memory (not shown), of the configuration system of IC 110. ICAP 408, for example, may operate under control of WBC 406 as described. Under control of WBC 406, for example, ICAP 408 is capable of controlling operation of memory controller 404 to retrieve firmware from non-volatile memory 112 and load such firmware into IC 110. The address of non-volatile memory 112 from which the firmware may be obtained may be specified in warm boot start address register 410. For example, ICAP 408 is capable of controlling operation of memory controller 404 to load an image file from non-volatile memory 112 located at the address specified in warm boot start address register 410 into IC 110 and write the image file to configuration memory of IC 110, thereby implementing the electronic system specified by the image file within IC 110.

In one aspect, platform circuitry 206 may be used to store new versions of firmware within non-volatile memory 112. For example, an image file containing new or updated firmware for IC 110 may be received from host system 102 via communication link 108 at communication interface 402. Communication interface 402 is capable of conveying the image file to memory controller 404. Memory controller 404 is capable of writing the image file (e.g., a new and/or different version of platform image 116) to non-volatile memory 112. In this manner, host system 102 may provide different firmware to accelerator card 104 from time-to-time.

Though not illustrated, platform circuitry 206 may include one or more additional components and/or connections to user circuitry. User circuitry, for example, may connect to one or more switches and/or interfaces that couple to communication interface 402 and/or other components such as a memory controller for volatile memory 118.

Figure 5:
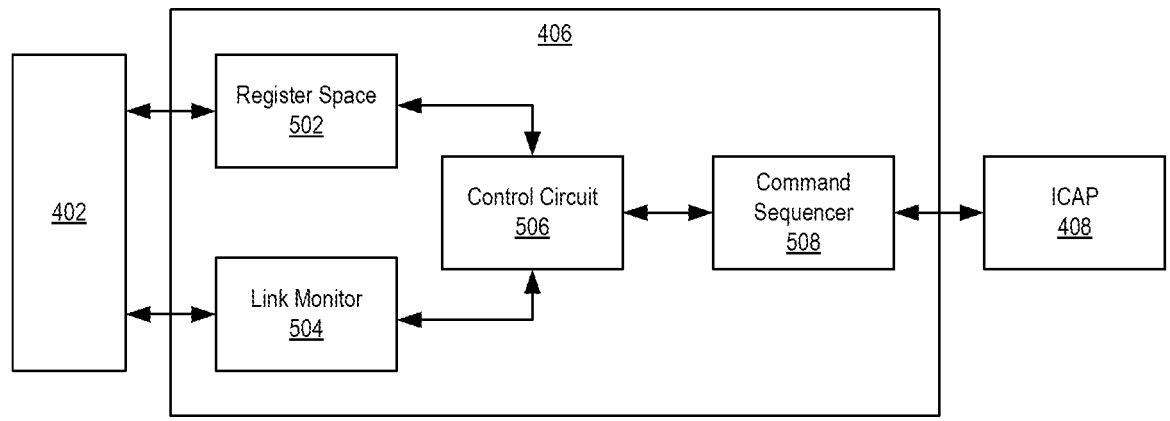
FIG. 5 is an example implementation of a warm boot controller.

FIG. 5 is an example implementation of WBC 406. In the example, WBC 406 includes a register space 502, a link monitor 504, a control circuit 506, and a command sequencer 508.

Register space 502 includes one or more registers that may be read and/or written by host system 102 over communication link 108 via communication interface 402. In one aspect, interface 402 may be connected to register space 502 via a control interface. An example of a control interface is an AXI-L interface (Advanced Microcontroller Bus Architecture (AMBA) eXtensible Interface (AXI)). AXI defines an embedded microcontroller bus interface for use in establishing on-chip connections between compliant circuit blocks and/or systems. Further, register space 502 may be read by control circuit 506. Register space 502 may include a register or bit location that serves as a warm boot enable flag and one or more registers that are capable of storing an address of a platform image provide by host system 102.

AXI is provided as an illustrative example of a bus interface that may be used to establish on-chip connections and is not intended as a limitation of the examples described within this disclosure. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

Link monitor 504 is capable of monitoring operation of communication interface 402 to determine the status of communication link 108. In one aspect, link monitor 504 is capable of monitoring the status of a port link of host system 102 that is upstream from IC 110. Link monitor 504 is capable of detecting that communication link 108 is connected to host system 102 or disconnected from host system 102. When communication link 108 is disconnected, host system 102 is unable to communicate with accelerator card 104 and/or IC 110. When communication link 108 is connected, host system 102 is able to communicate with accelerator card 104 and/or IC 110. In response to detecting that communication link 108 is disconnected, link monitor 504 is capable of informing control circuit 506 of the status of communication link 108.

In general, control circuit 506 is capable of reading data from register space 502 and receiving updates on the status of communication link 108 from link monitor 504. In response to particular conditions being met, control circuit 506 is capable of initiating the loading of the platform image from non-volatile memory 112. For example, control circuit 506 is capable of monitoring the status of the warm boot enable flag within register space 502 to detect when the warm boot enable flag is set. Control circuit 506 is capable of reading data such as addresses from register space 502 to provide such data to command sequencer 508. Control circuit 506 also is capable of communicating with link monitor 504. Accordingly, control circuit 506 is capable of determining that, or when, communication link 108 is disconnected. In an example implementation, control circuit 506 is capable of initiating loading of the platform image in response to determining that the warm boot enable flag of the register space is set and that communication link 108 is disconnected Command sequencer 508 is capable of communicating with ICAP 408. In the example of FIG. 5, command sequencer 508 is capable of generating the data that writes warm boot start address register 410 and that specifies the sequence of commands that instructs, or causes, ICAP 408 to begin or initiate loading the platform image into IC 110.

Figure 6:
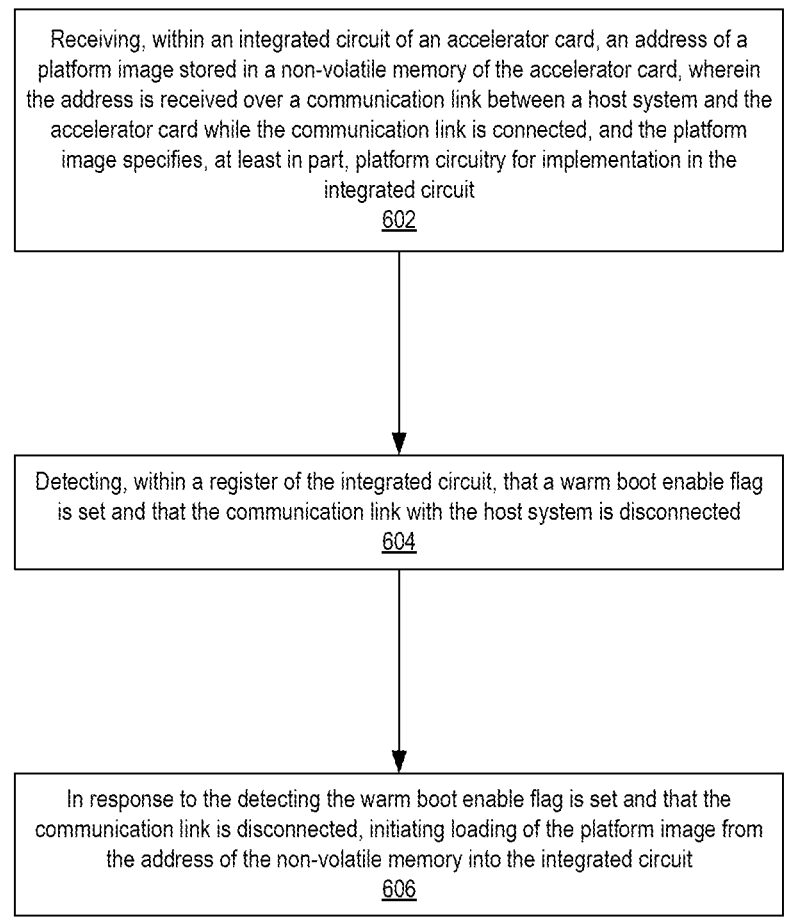
FIG. 6 illustrates an example method of changing the image of an accelerator card without rebooting the host system.

FIG. 6 illustrates an example method of changing the image of an accelerator card without rebooting the host system (e.g., performing a warm boot of IC 110). The example of FIG. 6 may be performed by an IC such as IC 110.

In block 602, an address is received within IC 110 of accelerator card 104. For example, host system 102 may provide or write the address into one or more registers of register space 502 of WBC 406. The address may be for a platform image previously stored in non-volatile memory 112 of accelerator card 104. The address is received over communication link 108 between host system 102 and accelerator card 104 while communication link 108 is connected.

The platform image may be a different platform image that is currently implemented in IC 110. The platform image may include only platform circuitry as described in connection with FIG. 3 or may include both platform circuitry and user circuitry as described in connection with FIG. 4. Accordingly, the platform image specifies, at least in part, platform circuitry (e.g., platform circuitry 206 and/or a different version thereof) for implementation in IC 110.

In block 604, IC 110 detects that a warm boot enable flag is set within a register (e.g., in register space 502) and that communication link 108 with host system 102 is disconnected. For example, control circuit 506 is capable of monitoring a register or bit location of register space 502 referred to as the warm boot enable flag. Control circuit 506 is capable of detecting that the warm boot enable flag has been set by host system 102. The warm boot enable flag may be set by host system 102 via communication link 108 while connected.

Further, in one aspect, control circuit 506 instructs link monitor 504 to begin monitoring the status of communication link 108 in response to detecting that the warm boot enable flag is set. In another example implementation, link monitor 504 may continually monitor the status of communication link 108. That is, link monitor 504 may monitor the status of communication link 108 without first being instructed to do by control circuit 506 in response to detecting that the warm boot enable flag is set.

Link monitor 504 monitors the status of communication link 108 and detects when communication link 108 is disconnected. In response to detecting that communication link 108 is disconnected, link monitor 504 notifies control circuit 506.

Accordingly, in block 606, in response to detecting that the warm boot enable flag is set and that communication link 108 is disconnected, IC 110 is capable of initiating loading of the platform image from the address of non-volatile memory 112 into IC 110. Loading the platform image from the address of non-volatile memory 112 effectively updates the firmware of IC 110 without having to reboot host system 102. For example, the loading the platform image into IC 110 implements, within IC 110, the platform circuitry specified by the firmware.

For example, control circuit 506 is capable of reading the address of the platform image to be loaded into IC 110 from register space 502 and providing the address to command sequencer 508. Command sequencer 508, in response, is capable of generating the instructions necessary to cause ICAP 408 to load the platform image from the address in non-volatile memory 112. Command sequencer 508 provides the instructions to ICAP 408 and the address to warm boot start address register 410. ICAP 408, in response, initiates the loading of the platform image from non-volatile memory 112.

The loading the platform image from non-volatile memory 112 into IC 110 is performed while communication link 108 is disconnected. Host system 102 is capable of connecting communication link 108 after a predetermined amount of time. Host system 102 remains operational throughout the communication link being disconnected and connected (or re-connected) after the predetermined amount of time. That is, host system 102 is not rebooted during the noted time span. Rather, host system 102 is capable of continuing operation uninterrupted to execute application(s), respond to requests, and the like. Further, any other expansion cards of host system 102 not undergoing a firmware update may remain operational during this time span.

Figure 7:
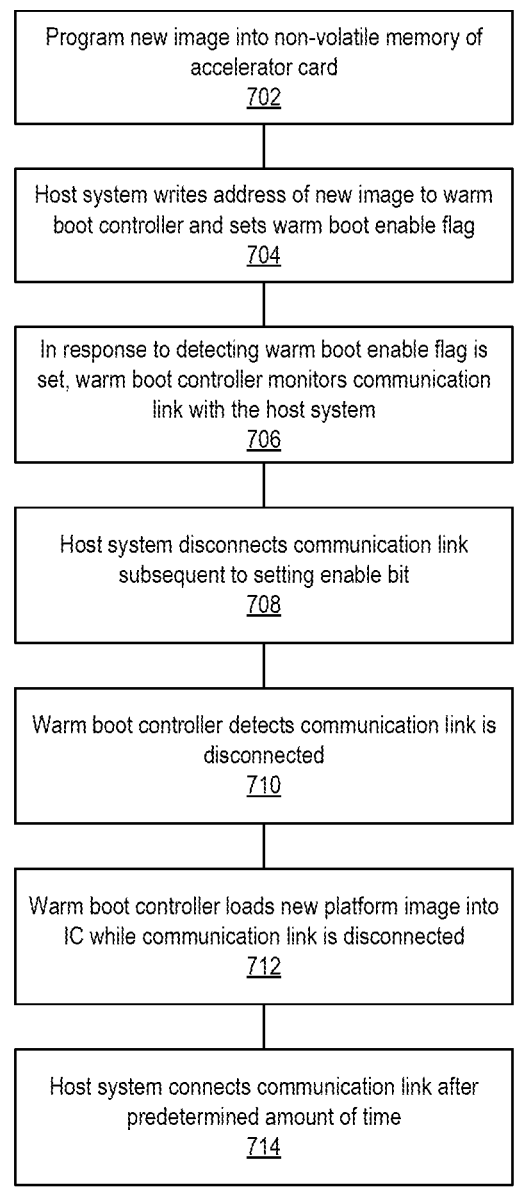
FIG. 7 illustrates another example method of changing the image of an accelerator card without rebooting the host system.

FIG. 7 illustrates another example method of changing the image of an accelerator card without rebooting the host system. The example of FIG. 7 illustrates additional operative features of the inventive arrangements.

In block 702, host system 102 is capable of programming a new platform image into non-volatile memory 112 of accelerator card 104.

In block 704, as part of initiating a warm boot firmware update of IC 110, host system 102 is capable of writing an address of the new platform image to a register of register space 502. The address written to register space 502 is the address to which the new platform image is written to non-volatile memory 112. Also, host system 102 is capable of writing, or setting, a warm boot enable flag (e.g., a bit) within register space 502.

In block 706, in response to detecting that the warm boot enable flag is set, WBC 406 is capable of monitoring communication link 108 with host system 102 to determine the status of communication link 108. In one aspect, control circuit 506 instructs link monitor 504 to begin monitoring the status of communication link 108 in response to determining that the warm boot enable flag is set. In another aspect, link monitor circuit may continually monitor the status of communication link 108 without being prompted to do so as described in block 706.

In block 708, host system 102 is capable of disconnecting communication link 108 in response to setting the warm boot enable flag. For example, host system 102 is capable of disconnecting communication link 108 by unloading software drivers 106 of host system 102 used to communicate with accelerator card 104 via the communication link 108. Host system 102, for example, may remove software drivers 106 from runtime memory (e.g., RAM). Further, host system 102 is capable of removing an upstream port of communication link 108. Host system 102 is also capable of adjusting a bit in a link control register offset maintained in host system 102 that disables communication link 108.

In block 710, WBC 406 is capable of detecting that communication link 108 is disconnected. Link monitor 504 detects that communication link 108 is disconnected and, in response notifies control circuit 506 of the disconnected state.

In block 712, WBC 406 is capable of loading a new platform image into IC 110 while communication link 108 is disconnected. For example, in response to determining that the warm boot enable flag is set and that communication link 108 is disconnected, control circuit 506 is capable of initiating the warm boot process within IC 110. Control circuit 506 is capable of reading the address of the platform image from register space 502 and providing the address to command sequencer 508. Control circuit instructs command sequencer 508 to begin the loading process. Accordingly, command sequencer 508 is capable of formatting the data to be provided to ICAP 408 to commence loading of the platform image into IC 110. The data includes the address along with the command and/or commands provided to ICAP 408. In one aspect, command sequencer 508 is capable of writing the address of the platform image to warm boot start address register 410 along with instructing ICAP 408 to begin loading the platform image.

ICAP 408 is capable of loading the platform image using memory controller 404. ICAP 408 writes the platform image to the appropriate configuration memory locations and/or registers of IC 110 thereby implementing the circuit architecture specified by the platform image within IC 110. The circuit architecture may include only the platform circuitry or both platform circuitry and user circuitry.

In block 714, host system 102 is capable of connecting communication link 108 after a predetermined amount of time. The amount of time that host system 102 waits between disconnecting communication link 108 and connecting (e.g., re-connecting) communication link 108 may vary based on a variety of factors that may include, but are not limited to, the model of accelerator card 104, model of IC 110, the size of the platform image, and the like. In general, the predetermined amount of time is long enough for the platform image to be loaded into IC 110 and for IC 110 to being operating using the updated circuit architecture therein. The predetermined amount of time may be long enough to ensure this process completes without having an excessive amount of time with IC 110 being idle before connecting communication link 108.

In one aspect, host system 102 is capable of connecting communication link 108 by adjusting the bit in the link control register offset that enables communication link 108. Further, host system 102 is capable of rescanning communication interface 402. Host system 102 may then load software drivers 106 for communicating with accelerator card 104 via communication link 108. It should be appreciated that host system 102 remains operational throughout communication link 108 being disconnected and connected after the predetermined amount of time.

Figure 8:
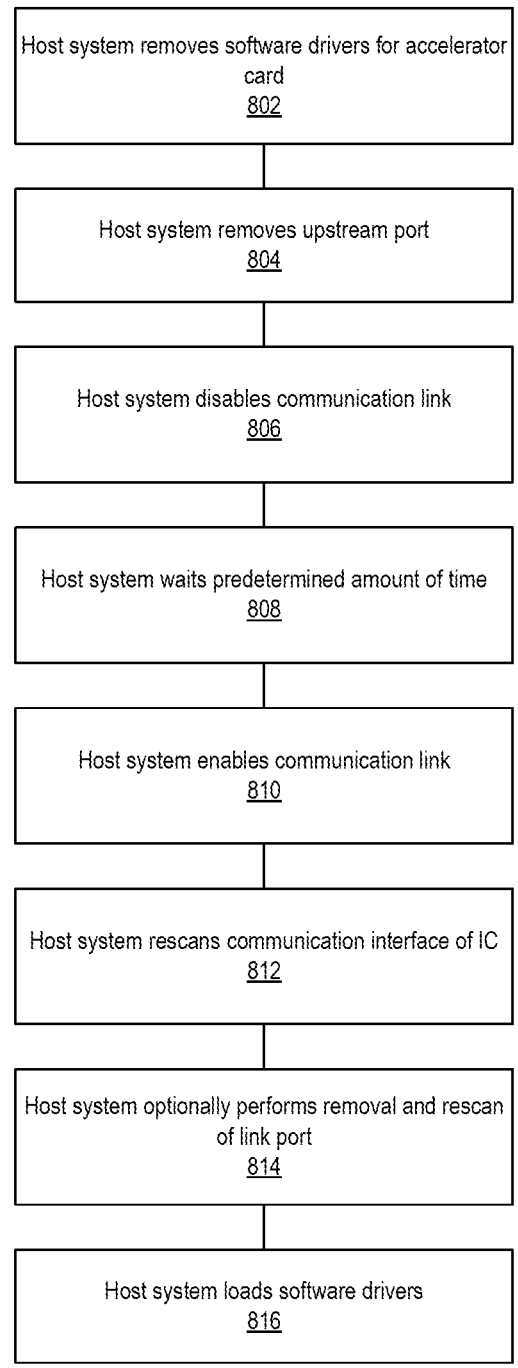
FIG. 8 is an example method that may be performed by a host system.

FIG. 8 is an example method that may be performed by host system 102.

The example method of FIG. 8 elaborates on further operative features of host system 102 that may be performed to disconnect communication link 108 and subsequently connect communication link 108 after the predetermined amount of time. In this regard, method 800 may be performed responsive to writing the address of the platform image to register space 502 and setting the warm boot enable flag therein.

In the example that follows, certain example operations are accompanied by example command line commands. In one aspect, these commands may be executed by a suitable application executing in host system 102. For example, the commands may be included in a script file that may be executed by host system 102. As defined within this disclosure, the term "upstream port" is a port of communication interface 402 in IC 110 facing toward host system 102. As defined within this disclosure, the term "link port" is the port of host system 102 to which the upstream port is to connect to establish communication link 108.

In block 802, host system 102 removes software drivers 106 for accelerator card 104. Removing software drivers 106 (e.g., unloading software drivers 106 from runtime memory of host system 102) avoids any crashes of software drivers 106 during the firmware migration performed as part of the warm boot. In performing block 802, host system 102 may execute the commands below.

sudo rmmod xocl
    sudo rmmod xclmgmt
    sudo rmmod nvme

In block 804, host system 102 removes the upstream port. Host system 102 removes the upstream port prior to disconnecting communication link 108 (e.g., prior to "bringing down the link"). In performing block 804, host system 102 may execute the command below.

echo 1>/sys/bus/pci/devices/0000\:d9\:00.0/remove

In block 806, host system 102 disables communication link 108. For example, host system 102 is capable of setting a Link Disable bit in the link control register (e.g., at offset 10*h*) of the link port to disable communication link 108. In performing block 806, host system 102 may execute the command below.

setpci -s d8:00.0 A0.b=70

In one or more example implementations, blocks 802, 804, and 806 may be performed by host system 102 as part of disconnecting communication link 108.

In block 808, host system 102 is capable of waiting for IC 110 to be reprogrammed, e.g., for the platform firmware to be loaded. The amount of time may vary according to any of a variety of factors including, but not limited to, the type of accelerator card 104, the type of IC 110, non-volatile memory programming capabilities of IC 110, clock frequencies, and the like. For purposes of illustration, the predetermined amount of time may be set to 10 seconds.

In block 810, in response to expiration of the predetermined amount of time, host system 102 is capable of enabling communication link 108. Host system 102 is capable of clearing the Link Disable bit in the link control register of the link port (e.g., offset 10*h*) to enable communication link 108. In performing block 810, host system 102 may execute the command below.

setpci -s d8:00.0 A0.b=60

In block 812, host system 102 is capable of performing a rescan of communication interface 402. The rescan brings back the communication link 108 between the host system 102 and accelerator card 104 with the new platform image loaded into IC 110 on accelerator card 104. In performing block 812, host system 102 may execute the command below.

echo 1>/sys/bus/pci/rescan

In block 814, host system 102 optionally performs a removal and rescan of the link port. Some data processing systems (e.g., servers) may need to perform the additional operations of removing and rescanning depending on the particular operating system executed by the data processing system. In performing block 814, host system 102 may execute the commands below.

echo 1>/sys/bus/pci/devices/0000\:d8\:00.0/remove
    echo 1>/sys/bus/pci/rescan In block 816, host system 102 loads (e.g., reloads) the software drivers. In performing block 816, host system 102 may execute the commands below.

sudo modprobe xocl
    sudo modprobe xclmgmt
    sudo modprobe nvme

In one or more example implementations, blocks 810, 812, optionally 814, and 816 may be performed by host system 102 as part of connecting, or re-connecting, communication link 108.

In particular implementations, the insertion of additional delays between the blocks and/or commands described in the example of FIG. 8 may be necessary. Example delays of 10-20 seconds may be used.

In implementations where accelerator card 104 is connected to host system 102 by way of certain switches, one or more GRUB settings may need to be applied. GRUB is the reference implementation of the Free Software Foundation's Multiboot Specification, which provides a user the choice to boot one of multiple operating systems installed on a computer or select a specific kernel configuration available on a particular operating system's partitions. The GRUB settings may need to be applied before implementing the operations of block 816. For example, host system 102 may apply the GRUB settings using the command below:

GRUB_CMDLINE_LINUX="pci=assign-busses,hpbussize=4,hpmemsize=<2*P2P BAR size>,realloc=on"

Omitting application of the GRUB settings may cause BAR assignment issues. After applying the GRUB settings, host system 102 may execute the commands below.

echo 1>/sys/bus/pci/devices/0000\:5d\:02.0/remove
    echo 1>/sys/bus/pci/rescan Subsequent to each cold or warm reboot, the root port of the switch should be removed and rescanned. Violating this may cause solid-state-drive (SSD) enumeration issues.

Figure 9:
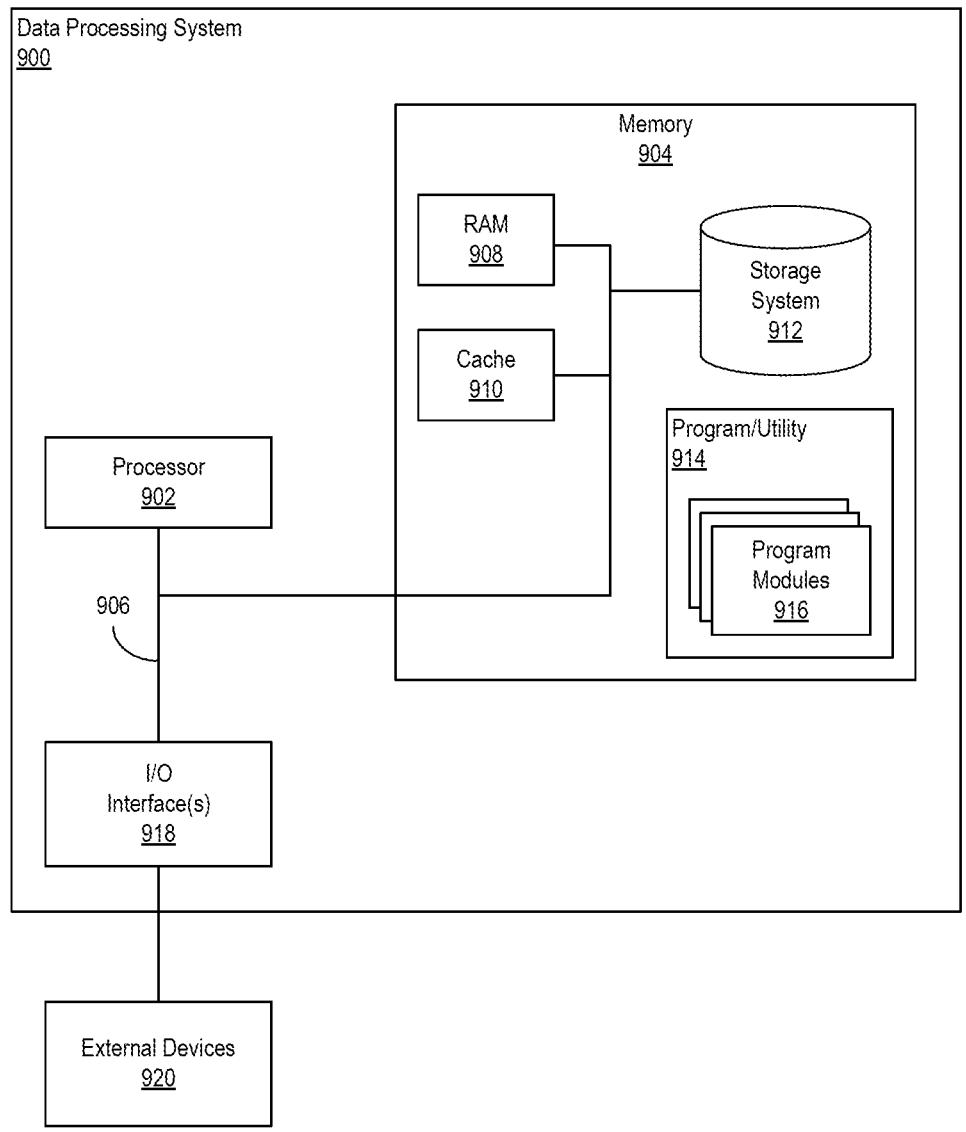
FIG. 9 illustrates an example implementation of a data processing system.

FIG. 9 illustrates an example implementation of a data processing system 900. The components of data processing system 900 can include, but are not limited to, a processor 902, a memory 904, and a bus 906 that couples various system components including memory 904 to processor 902. Processor 902 may be implemented as one or more interconnected processors. In an example, processor 902 is implemented as a central processing unit (CPU). Example processor types include, but are not limited to, processors having an x86 type of architecture (IA-32, IA-64, etc.), Power Architecture, ARM processors, and the like.

Bus 906 represents one or more of any of a variety of communication bus structures. By way of example, and not limitation, bus 906 may be implemented as a PCIe bus. Data processing system 900 typically includes a variety of computer system readable media. Such media may include computer-readable volatile and non-volatile media and computer-readable removable and non-removable media.

Memory 904 can include computer-readable media in the form of volatile memory, such as random-access memory (RAM) 908 and/or cache memory 910. Data processing system 900 also can include other removable/non-removable, volatile/non-volatile computer storage media. By way of example, storage system 912 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. Memory 904 is an example of at least one computer program product.

Program/utility 914, having a set (at least one) of program modules 916, may be stored in memory 904. By way of example, program modules 916 may represent an operating system, one or more application programs, other program modules, and program data. Program modules 916 generally carry out the functions and/or methodologies of the example implementations described within this disclosure. For example, one or more of program modules 916 can implement the drivers used to communicate with accelerator card 104 and/or other applications that, when executed, are capable of invoking operations in accelerator card 104.

Program/utility 914 is executable by processor 902. Program/utility 914 and any data items used, generated, and/or operated upon by data processing system 900 are functional data structures that impart functionality when employed by data processing system 900.

Data processing system 900 may include one or more Input/Output (I/O) interfaces 918 communicatively linked to bus 906. I/O interface(s) 918 allow data processing system 900 to communicate with one or more external devices 920 and/or communicate over one or more networks such as a local area network (LAN), a wide area network (WAN), and/or a public network (e.g., the Internet). Examples of I/O interfaces 918 may include, but are not limited to, network cards, modems, network adapters, hardware controllers, etc. Examples of external devices 920 also may include devices that allow a user to interact with data processing system 900 (e.g., a display, a keyboard, and/or a pointing device) and/or other devices such as accelerator card 104.

Data processing system 900 is only one example implementation. Data processing system 900 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 9 is not intended to suggest any limitation as to the scope of use or functionality of example implementations described herein. Data processing system 900 is an example of computer hardware that is capable of performing the various operations described within this disclosure. Data processing system 900 is also an example implementation of host system 102.

Data processing system 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 900 may be operational with numerous other general-purpose or special-purpose computing system environments or configurations. Examples of computing systems, environments, and/or configurations that may be suitable for use with data processing system 900 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 900 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 10:
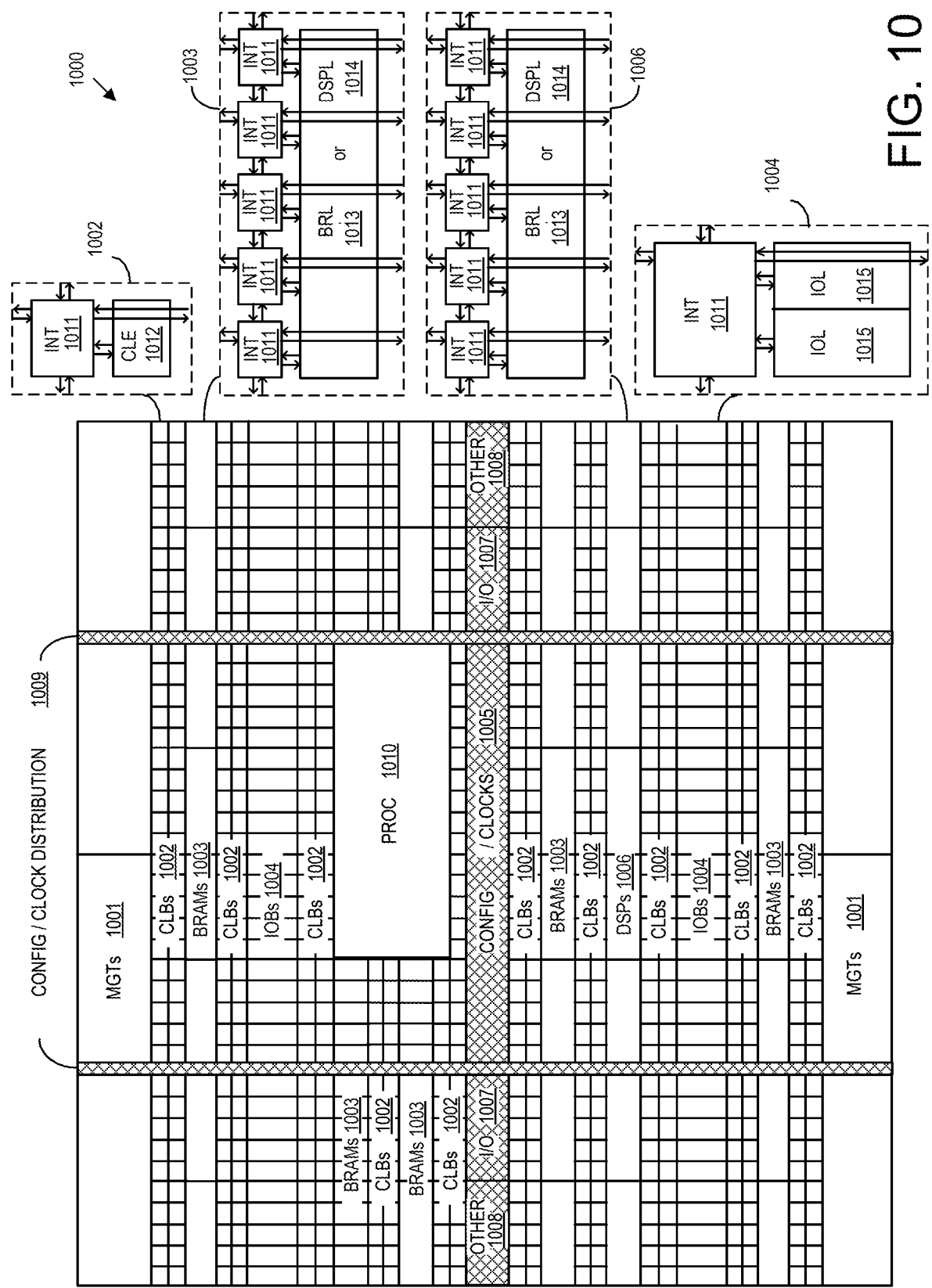
FIG. 10 illustrates an example architecture for an integrated circuit.

FIG. 10 illustrates an example architecture 1000 for an IC. In one or more example implementations, architecture 1000 may be used to implement IC 110 of FIG. 1. For example, architecture 1000 may be implemented within a programmable IC. A programmable IC is an IC with at least some programmable circuitry. Programmable circuitry may include programmable logic. For example, architecture 1000 may be used to implement an FPGA.

Architecture 1000 may also be representative of an SoC type of IC. An example of an SoC is an IC that includes a processor that executes program code and one or more other circuits. The other circuits may be implemented as hard-wired circuitry, programmable circuitry, and/or a combination thereof. The circuits may operate cooperatively with one another and/or with the processor.

As shown, architecture 1000 includes several different types of programmable circuit, e.g., logic, blocks. For example, architecture 1000 may include a large number of different programmable tiles including multi-gigabit transceivers (MGTs) 1001, configurable logic blocks (CLBs) 1002, random-access memory blocks (BRAMs) 1003, input/output blocks (IOBs) 1004, configuration and clocking logic (CONFIG/CLOCKS) 1005, digital signal processing blocks (DSPs) 1006, specialized I/O blocks 1007 (e.g., configuration ports and clock ports), and other programmable logic 1008 such as digital clock managers, analog-to-digital converters, system monitoring logic, and so forth.

In some ICs, each programmable tile includes a programmable interconnect element (INT) 1011 having standardized connections to and from a corresponding INT 1011 in each adjacent tile. Therefore, INTs 1011, taken together, implement the programmable interconnect structure for the illustrated IC. Each INT 1011 also includes the connections to and from the programmable logic element within the same tile, as shown by the examples included at the right of FIG. 10.

For example, a CLB 1002 may include a configurable logic element (CLE) 1012 that may be programmed to implement user logic plus a single INT 1011. A BRAM 1003 may include a BRAM logic element (BRL) 1013 in addition to one or more INTs 1011. Typically, the number of INTs 1011 included in a tile depends on the height of the tile. As pictured, a BRAM tile has the same height as five CLBs, but other numbers (e.g., four) also may be used. A DSP tile 1006 may include a DSP logic element (DSPL) 1014 in addition to an appropriate number of INTs 1011. An IOB 1004 may include, for example, two instances of an I/O logic element (IOL) 1015 in addition to one instance of an INT 1011. The actual I/O pads connected to IOL 1015 may not be confined to the area of IOL 1015.

In the example pictured in FIG. 10, the shaded area near the center of the die, e.g., formed of regions 1005, 1007, and 1008, may be used for configuration, clock, and other control logic. Shaded areas 1009 may be used to distribute the clocks and configuration signals across the breadth of the programmable IC.

Some ICs utilizing the architecture illustrated in FIG. 10 include additional logic blocks that disrupt the regular columnar structure making up a large part of the IC. The additional logic blocks may be programmable blocks and/or dedicated circuitry. For example, a processor block depicted as PROC 1010 spans several columns of CLBs and BRAMs.

In one aspect, PROC 1010 may be implemented as dedicated circuitry, e.g., as a hardwired processor, that is fabricated as part of the die that implements the programmable circuitry of the IC. PROC 1010 may represent any of a variety of different processor types and/or systems ranging in complexity from an individual processor, e.g., a single core capable of executing program code, to an entire processor system having one or more cores, peripherals, co-processors, interfaces, or the like.

In another aspect, PROC 1010 may be omitted from architecture 1000 and replaced with one or more of the other varieties of the programmable blocks described. Further, such blocks may be utilized to form a "soft processor" in that the various blocks of programmable circuitry may be used to form a processor that can execute program code as is the case with PROC 1010.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data (e.g., an image file) that is loaded into the IC. For example, circuit blocks shown in FIG. 10 that are external to PROC 1010 such as CLBs 1002 and BRAMs 1003 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1010.

In some instances, hardwired circuitry may have one or more operational modes that can be set or selected according to register settings or values stored in one or more memory elements within the IC. The operational modes may be set, for example, through the loading of a configuration bitstream (e.g., an image file) into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1010 or a soft processor. In some cases, architecture 1000 includes a dedicated configuration processor that loads the configuration bitstream to the appropriate configuration memory and/or processor memory. The dedicated configuration processor does not execute user-specified program code. In other cases, architecture 1000 may utilize PROC 1010 to receive the configuration bitstream, load the configuration bitstream into appropriate configuration memory, and/or extract program code for execution.

FIG. 10 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 10 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1010 within the IC are for purposes of illustration only and are not intended as limitations.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that in some cases, blocks of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
    receiving, within an integrated circuit of an accelerator card, an address of a platform image stored in a non-volatile memory of the accelerator card;
    wherein the address is received over a communication link between a host system and the accelerator card while the communication link is connected, and the platform image specifies, at least in part, platform circuitry for implementation in the integrated circuit;
    detecting, within a register of the integrated circuit, that a warm boot enable flag is set and that the communication link with the host system is disconnected; and
    in response to detecting that the warm boot enable flag is set and that the communication link is disconnected, initiating loading of the platform image from the address of the non-volatile memory into the integrated circuit.

2. The method of claim 1, wherein the loading the platform image into the integrated circuit implements the platform circuitry within the integrated circuit.

3. The method of claim 1, wherein the warm boot enable flag is set by the host system via the communication link while connected.

4. The method of claim 1, wherein the loading the platform image from the non-volatile memory into the integrated circuit is performed while the communication link is disconnected.

5. The method of claim 1, further comprising:
    the host system connecting the communication link after a predetermined amount of time.

6. The method of claim 5, wherein the host system remains operational throughout the communication link being disconnected and connected after the predetermined amount of time.

7. The method of claim 1, wherein the communication link is a Peripheral Component Interconnect Express (PCIe) communication link.

8. A system, comprising:
    an accelerator card having a non-volatile memory and an integrated circuit, wherein the integrated circuit includes:
        a communication interface configured to communicate over a communication link;
        a warm boot controller coupled to the communication interface;
        an internal configuration access port coupled to the warm boot controller;
        a memory controller coupled to the internal configuration access port, wherein the memory controller is configured to communicate with the non-volatile memory; and
        wherein the warm boot controller is configured to instruct the internal configuration access port to load a platform image from the non-volatile memory into the integrated circuit via the memory controller in response to determining that a warm boot enable flag is set and the communication link is disconnected.

9. The system of claim 8, wherein the platform image specifies, at least in part, platform circuitry for the integrated circuit and loading the platform image into the integrated circuit implements the platform circuitry within the integrated circuit.

10. The system of claim 8, wherein the communication link is a Peripheral Component Interconnect Express (PCIe) communication link.

11. The system of claim 8, wherein the platform image is loaded into the integrated circuit while the communication link is disconnected.

12. The system of claim 8, wherein the warm boot controller includes:
    a register space that is writable by a host system over the communication link;
    a control circuit configured to detect that a warm boot enable flag within the register space is set by the host system; and
    a link monitor configured to monitor the communication link to determine a status of the communication link and indicate the status to the control circuit in response to detecting that the communication link is disconnected.

13. The system of claim 12, wherein the control circuit is configured to initiate loading of the platform image in response to determining that the warm boot enable flag of the register space is set and that the communication link is disconnected.

14. The system of claim 13, wherein the register space is configured to receive an address of the platform image from the host system over the communication link.

15. The system of claim 14, wherein the warm boot controller includes:

a command sequencer configured to provide the address to the internal configuration access port and instruct the internal configuration access port to begin loading the platform image.

16. The system of claim 8, wherein the integrated circuit is coupled to a host system via the communication link, wherein the host system is configured to set the warm boot enable flag in the integrated circuit and, in response to setting the warm boot enable flag, disconnect the communication link.

17. The system of claim 16, wherein the host system is configured to disconnect the communication link by:

unloading software drivers of the host system for communicating with the accelerator card via the communication link;

removing an upstream port of the communication link; and adjusting a bit in a link control register offset that disables the communication link.

18. The system of claim 16, wherein the host system is configured to connect the communication link after a predetermined amount of time.

19. The system of claim 18, wherein the host system is configured to connect the communication link by:

adjusting a bit in a link control register offset that enables the communication link;

rescan the communication interface; and load software drivers of the host system for communicating with the accelerator card via the communication link.

20. The system of claim 18, wherein the host system remains operational throughout the communication link being disconnected and connected after the predetermined amount of time.

\* \* \* \* \*